Figure 1:
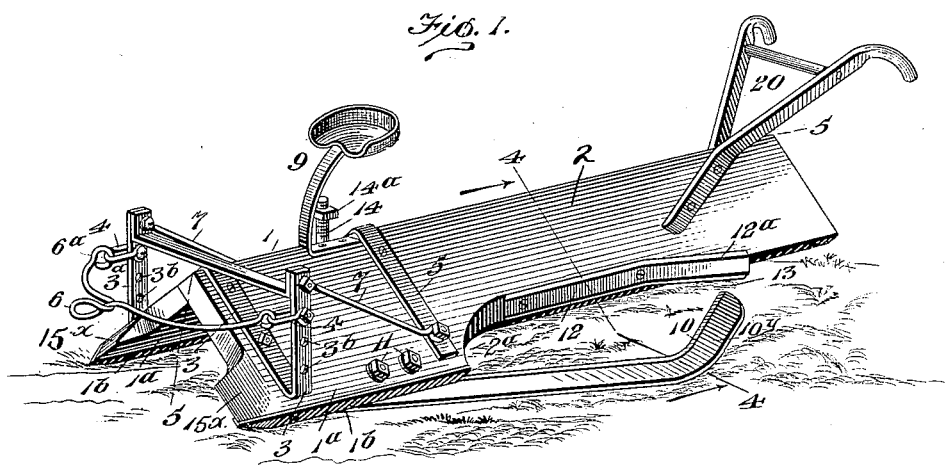

No. 648,761. Patented May 1, 1900.
A. KREIDT.
WEED CUTTER.
(Application filed Jan. 30, 1900.)
(No Model.) 2 Sheets—Sheet 1.

WITNESSES:
H. G. Dieterich
E. McCormic

INVENTOR
August Kreidt
BY
Fred G. Dieterich & Co.
ATTORNEYS

No. 648,761. Patented May 1, 1900.
A. KREIDT.
WEED CUTTER.
(Application filed Jan. 30, 1900.)
(No Model.) 2 Sheets—Sheet 2.
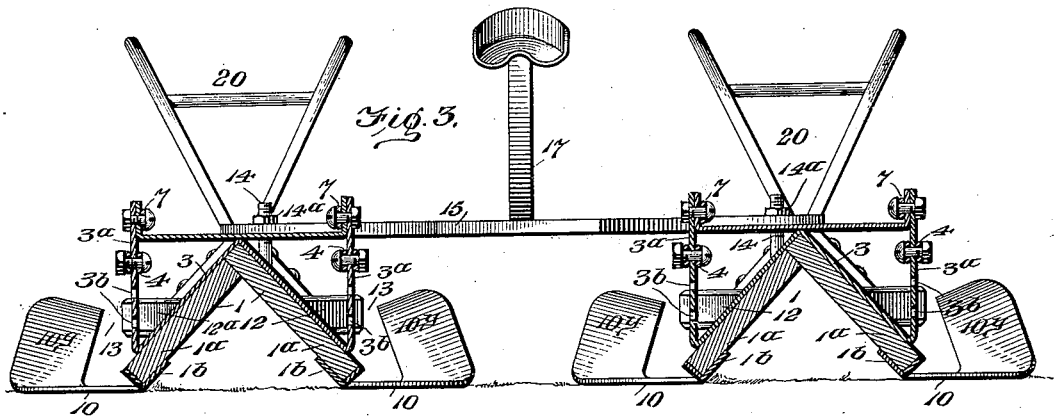
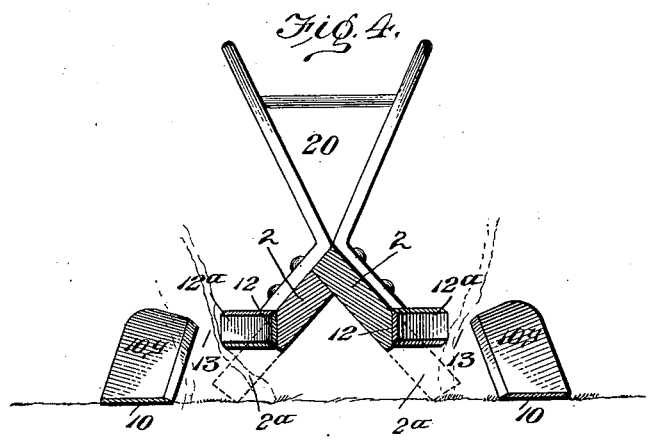
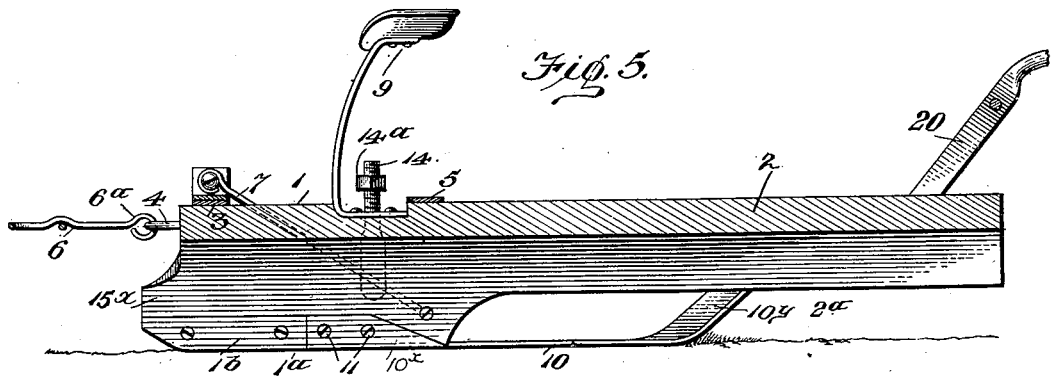
WITNESSES:
H. G. Dieterich
E. McCormic
INVENTOR
August Kreidt
BY
Fred G. Dieterich & Co.
ATTORNEYS

UNITED STATES PATENT OFFICE.

AUGUST KREIDT, OF INDIANOLA, NEBRASKA.

WEED-CUTTER.

SPECIFICATION forming part of Letters Patent No. 648,761, dated May 1, 1900.

Application filed January 30, 1900. Serial No. 3,317. (No model.)

*To all whom it may concern:*

Be it known that I, AUGUST KREIDT, residing at Indianola, in the county of Red Willow and State of Nebraska, have invented a new and Improved Weed-Cutter, of which the following is a specification.

My invention is in the nature of an improved means for cutting weeds and the like, and is particularly intended for trimming the lists of corn-fields; and the said invention primarily seeks to provide a machine for the purposes stated embodying the elements of simplicity of construction, ease in manipulation, effectiveness in use, and including the no less desirable quality of engaging with and cleanly trimming the inside of the lists.

Generally my invention comprehends an inverted trough-body the forward end of which is made of a maximum width, whereby its lower edge will form a drag the runners of which are adapted to engage the sides of the adjacent rows, while the upwardly-converging edge guides the weeds inward to bring them in a proper position to be engaged by the cutters, the main part of the body portion being of a reduced transverse area, whereby side openings or ways are provided between the knives or cutters and the lower edges of the reduced portion of the body and whereby the edges of the said reduced portion of the body will be held in a higher plane than the runners on the front or drag portion of the said body, the outer edges of the reduced portion thereby being adapted to serve as supporting portions against which the weeds are forced when engaged by the cutters.

My invention also comprehends in connection with the general structure above outlined supplemental cutters that coöperate with the main cutters and serve to engage the high weeds and large clog which the main cutters may pass by.

Again, my invention seeks to provide a simplified construction of machine, including a suitable bracing means for the front or drag portion, carrying adjustable clevis mechanism whereby the draft can be adjusted to suit the condition of the earth, wet or dry, and includes a simple means for coupling a pair of the machines so they may be used in duplicate to operate between two sets of rows when so desired.

In its subordinate features this invention consists of certain novel combinations and details of construction, all of which will be first described and then specifically pointed out in the appended claims, reference being had to the accompanying drawings, in which—

Figure 7:
Figure 2:
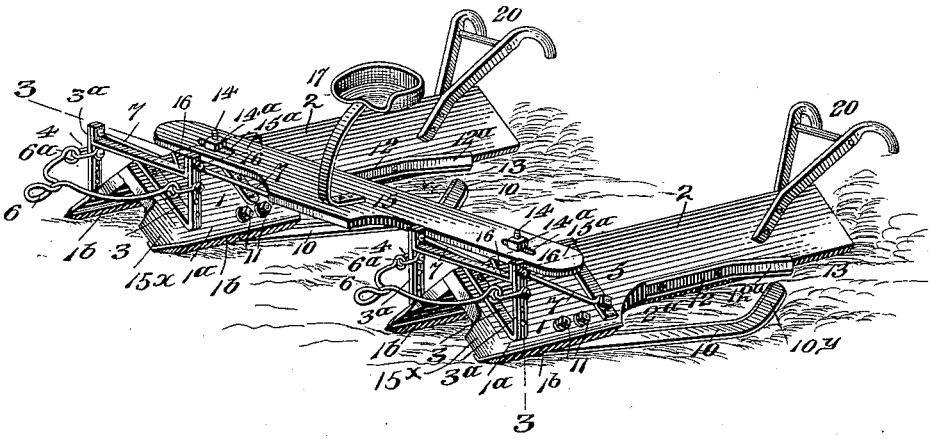
Figure 6:

Figure 1 is a perspective view of my invention as in use. Fig. 2 illustrates a pair of the weeding-machines coupled together. Fig. 3 is a transverse section taken practically on the line 3 3 of Fig. 2. Fig. 4 is a transverse section taken on the line 4 4 of Fig. 1 looking in the direction of the arrow. Fig. 5 is a longitudinal section of the same, taken practically on the line 5 5 of Fig. 1. Fig. 6 is a view of one of the combined moldboards and cutters detached. Fig. 7 is a detail view of one of the cutters 10, hereinafter referred to.

In the practical construction my invention has a wooden body portion made of heavy timbers in the shape of an inverted-V trough the sides of which diverge sufficiently to straddle or cover the weeds in the lists when used on listed corn-fields, the said body in a full-sized machine being about six and one-half feet long. The body comprises a front portion 1, which I term the "drag," and this portion is about two and one-half feet long, and the lower ends of its diverging walls are angled to form runners $1^a$, that will travel flatly against the sides of the rows, and the said runners are shod their entire length with strap-runners $1^b$, as shown.

At the rear end of the drag portion the body 2 is cut out at the lower ends of each side, in practice about three and one-half inches, the purpose of which is to hold all of the body, excepting the drag, from a close engagement with the ground, and more particularly to provide ways or spaces at each side of the reduced part of the body, as indicated at $2^a$, into which the weeds that are crowded under the drag can straighten up, the reason of which will presently appear.

Upon the extreme front end of the drag portion 1 is bolted a metal saddle-piece 3, the base of which is V-shaped, and the ends thereof are bent up at an angle, as at $3^a$, to form vertical clevis members, said members having like apertures 3$^b$.

4 4 designate clevis-links that are adjustably held on the members 3 and 4 and with which the yoke end 6$^a$ of a draft member 6 pivotally connects. The object in providing for adjustably connecting the draft-clevises is to adapt the machine for effective use in either dry or wet weather, the link 4 being intended to engage with the lower holes in wet weather and the upper holes in dry weather.

Secured upon the body at the rear end of the drag portion is a second V-shaped saddle 5, which, in connection with the front saddle, adds strength to the body and holds the two timbers that form the said body secure and rigidly together, and to further brace the drag portion rods 7 7 are provided that extend up from the rear saddle 5 to the upper ends of the clevis members 3.

9 designates a seat secured upon the ridge of the body near the rear end of the drag portion; and 20 indicates a pair of handles that are secured to the rear end of the body, as shown, said handles being more especially intended for use in turning the machine at the ends of the rows.

10 indicates the main guides or cutters, of which two are provided, one at each side. Each knife is made of steel, in practice three and one-half feet long and so shaped as to trim the inside of the lists. The said knives are disposed flatwise and are secured at their front ends to the under side of the drag portion by bolts and nuts 11, as shown, they being extended divergingly rearward, with their cutting edges facing the body 1, and their outer extremities are curved upward to facilitate their cutting action and also to crowd the longer weeds against the supplemental knives, presently referred to.

12 12 indicate supplemental cutters or knives, which consist of bent irons secured one on the lower edge of each of the side members of the rear portion of the V-shaped body, the rear ends of the said knives being bent outward, as at 12$^a$ 12$^a$, the lower edges of the outward-bent portions being sharpened and the said bent portions extended toward the curved ends of the main knives, whereby the contracted spaces between the two sets of knives are provided, which serve to bunch the weeds as they pass through the throat of the spaces 13, the knives 12 12 being especially adapted for cutting long weeds.

From the foregoing, taken in connection with the drawings, it is thought the operation and advantages of my invention will be readily understood.

As the machine is drawn along the weeds are gathered under the drag portion and as they straighten up the bulk of the same tends to pass up toward the knives and the reduced part of the body and are cut by the knives as they are dragged along.

It will be noticed that my machine is of a very simple but stable construction and has its parts so arranged as to admit of its being made by any blacksmith, no special skill being necessary to construct it.

One of the essential features in constructing the machine in the manner described is that two of them may be readily employed and worked together, as shown in Fig. 2, and to provide for quickly coupling or uncoupling a pair of them the front saddle member of each machine has a vertical rod 14, threaded at its upper end, with which rods the slotted ends 15$^a$ of the coupling-bar 15 engage, which is held securely by the nuts 14$^a$, the said ends 15$^a$ of the coupling-bar being extended to rest upon the ridge of the drag portion of each machine, as clearly shown in Fig. 2, and when so formed the seats of the two machines are removed and the V-shaped wear-plate 16 is fitted on the ridge of each machine, upon which the ends 15$^a$ of the coupling-bar rest. A single seat 17 is then supported centrally upon the coupling-bar.

While I have described my invention as especially useful for cutting weeds on cornfields, it is manifest that the same may be used for trimming weeds on flat ground.

To facilitate the dragging action of the machine, the front edges of the body portion 1 are pointed or sharpened, as at 15$^x$, whereby to penetrate clog or hilly surfaces and disintegrate them as the machine is drawn forward.

It will be noticed by reference to Fig. 6 that the cutters 10 have their flat body portions, which portions in the practical machine are from fourteen to sixteen inches in width, terminate at their forward end in upturned flanges 10$^x$, that are adapted to fit up against the lower end of the inside of the body 1, as clearly shown in Fig. 5, the rear ends of said cutters terminating in upturned and inwardly-curved members 10$^y$.

The flat portions of the cutters form, as it were, moldboard-sections; but they differ from the ordinary form of listing cutter or moldboard blades in that instead of having their outer edges sharpened, as is usual, they have their inner edges sharpened, and by reason thereof and on account of their ends being curved upward and inward the earth instead of being thrown outward and forward, as is done in the common form of lister or weed cutting machines, is crowded inward and rearward.

Having thus described my invention, what I claim, and desire to secure by Letters Patent, is—

1. A weed-cutter, comprising a Λ-shaped body, the forward end of which forms a drag, the remaining portion thereof being of a reduced height and width, cutters projected laterally and rearwardly from the said body and draft devices on the front end of the body, substantially as shown and described.

2. A weed-cutter, comprising a Λ-shaped body, the forward end of which forms a drag, the rear portion being of a less depth and width than the front portion; cutters from the body at an acute angle thereto, the rear ends of which terminate in upturned portions and draft devices secured to the front end of the body, as specified.

3. A weed-cutter, comprising a Λ-shaped body, the front end of which is of greater depth than the remainder; guide-handles on the rear end of the body; draft devices secured to the front end of said body; cutters projected horizontally from the lower edge of the front portion of the body and extended rearwardly at an angle to the body; and a seat mounted upon the front part of the body, as set forth.

4. An appliance for the purposes described, comprising a pair of Λ-shaped bodies, the front portions of which form drags, the rear portion of each Λ-shaped body being of a less depth, whereby a space or way is provided at each side of the rear portions of such bodies; horizontally-disposed cutters projected laterally and rearwardly from each side of each body portion; each Λ-shaped body having an upwardly-extending coupling-rod, and a coupling member connected with said rods and fitted to rest upon the coupling member and draft devices connected with the two Λ-shaped bodies, all being arranged substantially as shown and for the purposes described.

5. In an appliance as described, the combination with the Λ-shaped body and the cutters extended laterally and rearwardly from the said body; of a saddle member fitted upon the front end of the body, having its ends terminating in vertical standards, each having a series of vertically-disposed apertures, and clevis-rings adjustably mounted on said apertured standards, substantially as shown and described.

6. A new and improved weed-cutter, comprising a Λ-shaped body, the forward portion of which forms a drag; the rear portion being of a less transverse width whereby its lower edge will be in a plane above the bottom edge of the front portion and its sides of less width than the sides of the said front portion; draft devices connected with the front of the body, the cutters 10 projected flatwise and horizontally from the bottom of the front portion of the body to which they are secured; said cutters extending rearwardly and outwardly in a plane below the lower edge of the rear or reduced portion of the body, their outer ends terminating in upwardly-curved portions, as specified.

7. In a weed-cutter as described, the combination with the Λ-shaped body, the front end of which forms a drag and the rear portion of which is of less width than the front portion whereby the lower edge of the said rear portion is in a higher plane than the bottom of the front portion; of the cutters 10 10, projected horizontally and flatwise from the lower edge of the front portion of the body, said cutters extending rearwardly from the body, and having the extremities terminating in upturned ends, and the cutters 12, secured to the outer edges of the reduced portion of the body, said cutters 12, being in a higher plane than the cutters 10, and having their rear ends 12ª, turned outward toward the upturned ends of the cutters 10, all being arranged substantially as shown and for the purposes described.

8. A weed-cutter, comprising a Λ-shaped body, the forward end of which forms a drag, the remaining portion thereof being of a reduced height and width; cutters projecting laterally and rearwardly from the said body, the inner edges of which are sharpened and the outer ends of which curve upward and inward, substantially as shown and described.

9. A weed-cutter, comprising a Λ-shaped body the forward ends of which terminate in sharpened or cutter portions and which end is constructed to form a drag, the remaining portion thereof being of a reduced height and width; cutters projected laterally and rearwardly from the said body, said cutters having flat moldboard-sections, the inner or rear faces of which are sharpened and the outer ends of which are curved upwardly and inwardly as specified.

AUGUST KREIDT.

Witnesses:
 H. BURGESS,
 CHAS. BURGESS.